2,875,059

PHOTOGRAPHIC EMULSIONS CONTAINING POLYAMIDES HAVING ETHER OXYGEN AND EXTRALINEAR HYDROXYL GROUPS

Cornelius C. Unruh and Donald A. Smith, Rochester, N. Y., assignors to Eastman Kodak Company, Rochester, N. Y., a corporation of New Jersey No Drawing. Application December 30, 1953
Serial No. 401,413

2 Claims. (Cl. 96—114)

This invention relates to the preparation of synthetic resins useful for photographic purposes which involves the reaction of organic diamines with dibasic acids in such a manner that the resulting product has ether oxygens present in the carbon chain and hydroxyl substituents thereon.

The preparation of linear polyamides has been described in the prior art and some of these materials have been prepared with the thought in mind of their usefulness for photographic emulsion purposes. Many of the linear polyamides are too hydrophobic to be of interest for photographic purposes whereas other of the materials of this type display limited solubility. The prior art has shown the preparation of certain types of polyamides in which ether oxygen groups have been introduced periodically in the chain. Although many of these compounds have exhibited satisfactory solubility and susceptibility to water the property of gelation which allows the use of good coating speeds and the application of comparatively thick coatings has been absent therefrom.

One object of our invention is to provide linear polyamides which are found not only satisfactory solubility and susceptibility to water but in addition these polymers are capable of gelation from aqueous solutions. Another object of our invention is to provide linear polyamides containing both hydroxyl groups and ether oxygen groups therein. A further object of our invention is to provide a process of preparing synthetic linear polyamides by reacting dibasic acids with diamines in such a manner that both hydroxyl and ether oxygen groups are incorporated in the products obtained. Other objects of our invention will appear herein.

We have found that linear polyamides which contain both ether oxygen groups and hydroxyl groups therein and have the proportion of the former to the latter of at least 1:3 and not more than 3:1 have desirable solubility properties and those polyamides will gell when coated out from aqueous solutions. Those products have desirable physical properties for use photographically. The preparation of these linear polyamides involves preparing the polyamine salts of dibasic acids and heating those salts under oxygen free conditions until the synthetic resin is obtained. Ordinarily the hydroxyl and ether oxygen groups in our synthetic polymers are supplied by the particular dibasic acids used. However, it is within the scope of our invention to supply these groups by means of either the dibasic acids or the diamines which are employed in the preparation of the resins as will be more fully explained herein.

In its broadest aspects our invention comprises the heating together of the salts of long chain aliphatic diamines and long chain dibasic acids of such composition that both hydroxyl groups and ether oxygens are present when the materials are heated together. The long chain aliphatic diamines which are employed may be diamines of from two up to ten carbon atoms and the dibasic acids may be of 6–10 carbon atoms. One procedure by which synthetic resins having both ether oxygens and hydroxyl groups may be obtained involves the preparation of the diamine salt of a dibasic acid containing ether oxygens and of the diamine salt of dibasic acid containing hydroxyl groups, mixing the salts together so that the hydroxyl groups are in a ratio to the ether oxygen groups of 1/3–3:1 and then subjecting the mixture to heat in the manner known in the art for producing linear polyamides.

The linear polyamides prepared in accordance with our invention are such that the ratio of the sum of the ether oxygens and hydroxyl oxygens in those polymers to the carbon atoms therein is 1:7–16. In the various combinations from which the linear polyamides are prepared the proportions of the various components and the structure of the materials used should be so controlled that the carbon atom content is within 7–16 parts per part of ether and hydroxyl oxygens which are employed in their preparation.

If dibasic acids are depended upon to supply all or part of the ether oxygen content any of the acids having the structural formula:

or

where $x$, $y$ and $z$ are numbers within the range of 1–4 may be employed in preparing the polyamides. Examples of acids of this type are diglycolic acid, ethylene bis-glycolic acid and acids such as

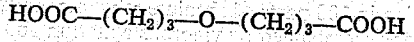

and

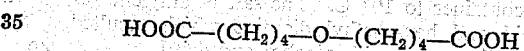

The hydroxyl acids which may be employed to supply hydroxyl substituents in the linear polyamides prepared in accordance with our invention are those acids having the formula:

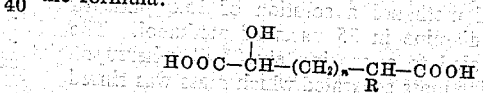

where R is hydrogen or hydroxyl and $n$ is 2–6. If a diamine rather than a dibasic acid is depended upon to supply ether oxygens or hydroxy substituents then a dibasic acid such as adipic acid, β-methyl adipic acid, pimelic acid, suberic acid, sebacic acid or the like may be employed instead of the ether acid or hydroxyl acid, as the case may be, in preparing the linear polyamide.

Any of the various diamines as are ordinarily employed in preparing linear polyamides may be used in preparing the polymers in accordance with our invention. Some of the diamines which may be employed in this connection are hexamethylene diamine, triglycol diamine, decamethylene diamine, tetramethylene diamine, octamethylene diamine, tetradecamethylene diamine, or the like. As pointed out above, if desired, a diamine can be employed to supply the ether oxygens either in whole or in part. The diamines which may be employed for this purpose may be any of those compounds having the structural formula $NH_2-M-NH_2$ where M represents either:

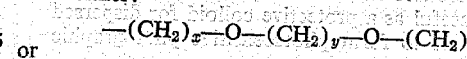

or

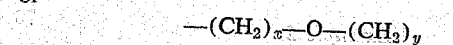

where $x$, $y$ and $z$ are within the range of 1–4. Examples of diamines which may be employed to supply ether oxygens are bis γ-amino-propoxyethane, 3-3'-diamino-dipropyl ether, triglycollyl diamine, etc.

In the carrying out of the polymerization to prepare products in accordance with our invention any suitable solvent may be employed or if desired the use of a solvent may be dispensed with as is well recognized in the art of preparing linear polyamides. In promoting the polymerization the mass should be heated to a polymer-promoting temperature less than the decomposition temperatures of the various reagents employed in the process. In most polymerizations in accordance with our invention temperatures within the range of 175–250° C. appear to have the greatest utility. However, the use of elevated temperatures sufficient to promote polymerization, as defined in the prior art, are within the scope of our invention.

It is found that the products prepared in accordance with our invention are soluble in a hot mixture of ethyl alcohol and water, such as equal parts of each, and that the solution when coated out in the form of a thin layer whereby cooling occurs, gels. The products in accordance with our invention have been found to be eminently suitable for use as vehicles in silver halide photographic emulsions in that the polymers exhibit the properties of protective colloids for silver halide, are soluble in various mixtures of water with organic solvents at elevated temperatures and upon cooling such as by applying to a non-heated surface as a thin layer these solutions gel, and in the gelled form may be dried to give clear, flexible, tough coatings.

The following examples illustrate the preparation of linear polyamides in accordance with our invention:

*Example 1*

30 parts of technical grade (85–90%) ethylene-bis-glycolic acid were dissolved in 100 parts of absolute ethyl alcohol and the solution was cooled at 0° C. There was added thereto a cold solution of 17.5 parts of hexamethylene diamine in 100 parts of absolute ethyl alcohol which addition was accompanied by vigorous agitation and cooling of the container to 10° C. The salt of ethylene bis-glycolic acid and hexamethyl diamine which resulted, was filtered off, washed with alcohol and dried.

The hexamethylene diamine salt of $\alpha,\alpha'$-dihydroxy-adipic acid (Bull. Soc. Chim. 16, 637 (1949), was dissolved by adding to a solution of 23.7 parts of the acid in 175 parts of methanol a solution of 15.5 parts of hexamethylene diamine in 35 parts of methanol. The mixture was cooled to approximately 0° C. whereupon a white crystalline mass separated which mass was rinsed with cool methanol and dried.

A mixture of 15 parts each of the two salts prepared above was placed in 30 parts of m-cresol and the mass was heated at 175° C. while still in an oxygen free atmosphere for 1½ hours. The container was then evacuated, the m-cresol was distilled off and the residue was heated and stirred in vacuo at 170–175° C. After one-half hour the mass became viscous and the temperature was allowed to rise to 200° C. over a period of 40 minutes. The linear polyamide obtained was allowed to cool and was then dissolved in a heated mixture of equal parts by weight of alcohol and water. This solution readily gelled when cooled. The hot solution was introduced into an excess of agitated acetone and a white, fibrous product was obtained which was dried at 40° C. The polymer thus obtained had an intrinsic viscosity in m-cresol of 0.78. Hot solutions of this polymer in alcohol-water when applied to a non-heated surface such as a glass plate gelled rapidly. The films thus formed were clear, flexible and tough. The polymer thus formed was eminently useful as a protective colloid for dispersed silver halide so as to form photosensitive photographic emulsions.

*Example 2*

A mixture was prepared of 15 parts of the diglycolic acid salt of hexamethylene diamine, 17.7 parts of the $\alpha,\alpha'$-dihydroxyadipic salt of hexamethylene diamine and 30 parts of m-cresol. This mixture was heated in an atmosphere of nitrogen to 185° C. over a period of 1¾ hours. The system was then evacuated, the m-cresol was distilled off and the mass was held at 195° C. for 2 hours. The polymer thus obtained was cooled, was dissolved in dilute ethanol and was precipitated in acetone to obtain a fluffy white fibrous polymer. The product obtained was soluble in hot alcohol-water mixtures which mixtures on cooling readily gelled. Coatings of this solution when applied to a non-heated surface, after drying, were clear, flexible and tough.

*Example 3*

A mixture of 13.1 parts of the ethylene bis-glycolic acid salt of hexamethylene diamine, 12.3 parts of the $\alpha$-hydroxyadipic acid salt of hexamethylene diamine and 30 parts of m-cresol was heated to 195° C. over a period of 3 hours. The system was then placed under vacuum and the temperature was raised to 224° C. over 2 hours. The polymer which was obtained was dissolved in hot dilute ethanol and precipitated by pouring into acetone. After washing with acetone and drying, 19.5 parts of white, fibrous polymer, the condensation product of the salts, was obtained. This product is soluble in hot alcohol-water mixtures, which solutions gel upon cooling.

*Example 4*

There was mixed together 7 parts of the adipic acid salt of 1,2-bis ($\gamma$-aminopropoxy)ethane, 5.6 parts of the $\alpha$-hydroxyadipic acid salt of hexamethylene diamine and 15 parts of m-cresol. The mass was heated in an atmosphere of nitrogen at 200° C. over a period of 1½ hours. The system was then placed under vacuum and the temperature was raised to 221° C. over 1½ hours. The linear polymer obtained after cooling was dissolved in hot dilute ethanol and was precipitated in acetone. This product was soluble in hot alcohol-water mixtures which solutions gelled upon coating out onto a non-heated surface.

*Example 5*

A photosensitive emulsion was prepared employing a 1:1:2 polyamide obtained as described in Example 1 using as the constituents thereof di-hydroxyadipic acid, ethylene-bis-glycolic acid, and hexamethylene diamine. 3 parts of this polyamide was dissolved in a mixture of 36 parts of water and 24 parts of ethanol, and this solution was heated to 60° C. This is solution A.

Solution B was prepared by dissolving 10 parts of ammonium bromide in a mixture of 23 parts of water and 15 parts of ethanol which solution was heated to 55° C.

Solution C was prepared by dissolving 11 parts of silver nitrate in a solution of 15 parts of ethanol in 18 parts of water and concentrated ammonia was added to this solution to convert the silver nitrate. This solution was heated to 55° C.

Solutions B and C were slowly introduced into stirred solution A, solution B having been started 3 seconds ahead of solution C. The total time of introduction of the two solutions was 2 minutes. The resulting silver halide emulsion was stirred for 15 minutes, while maintaining a temperature of approximately 60° C. A solution of 5 parts of polyamide in a solution of 18 parts of ethanol in 27 parts of water was stirred in and the resulting mass was cooled to 45° C.

The resulting emulsion was coagulated by adding acetone thereto, and the granules which formed were washed 3 times with distilled water and recovered as a damp precipitate by filtration. There was then mixed with the precipitate 180 parts of a 60:40 ethanol water mixture and 130 parts of a 10% solution of the polyamide in 60:40 ethanol-water. The precipitate was dispersed in the mass by stirring at 50° C. There was obtained an emulsion in the form of a stable dispersion which was capable of being coated either on glass plates or on paper. The coating thus formed sets rapidly upon chilling. The emulsion layer formed by coating, setting and drying was exposed by means of a photographic step tablet and was developed in Kodak D-16 developer and fixed in Kodak F-5 fixing solution. The image obtained had good photographic contrast and a net maximum density in the regions of fullest exposure of about 1.20.

In employing the polymers as described herein for photographic purposes the polymers may, for instance, be dissolved in water containing 5 to 60% of ethanol and light sensitive salts are dispersed therein. This may be accomplished by dissolving water soluble halide salts in a solution of the polymers and adding a solution of a silver salt thereto. The resulting emulsion can be obtained as a layer in gel form by coating it out onto a non-heated support. If desired the emulsion may be modified by adding more of the synthetic resin to the mass or by the addition of sensitizers, sensitizing dyes, and the like. If a washed emulsion is desired the mass may be chilled and noodled in the conventional way and the noodles may be washed. The emulsion may then be redispersed by subjecting the noodles to an elevated temperature. Upon coating the emulsion onto a support therefor gelling occurs almost immediately, particularly if cooled. Thus the emulsions prepared with polymers as described above have similar physical characteristics to gelatin emulsions. The dissolving of these polymers in water-alcohol will occur at temperatures within the range of 40–70° C.

We are aware of the disclosure of U. S. Patent No. 2,384,072 in which polyamides are prepared which are alleged to be useful as vehicles for photographic emulsions. These polymers contain linear oxygen atoms, but no hydroxyl groups in those polymers are attached to the carbon atoms in the chain. It is a characteristic of polyamides of the type described in that patent that the solutions thereof when coated out onto a cool surface coagulate (rather than gel) the layer resulting being white rather than transparent. It has been our experience that gelatin rather than coagulation upon coating out the hot solution onto a non-heated surface was obtained only with those polymers in which hydroxyl groups were present on the linear carbons in a ratio to those of the linear oxygens within the limits described above.

We claim:
1. A photographic emulsion comprising silver halide grains dispersed in an aqueous solution of a linear polyamide formed by condensing an aliphatic hydroxy dicarboxylic acid, the hydroxy of which is attached only to carbons alpha to the carboxyl groups, a diamine selected from the group consisting of the polymethylene diamines and the alkylene diamines containing ether oxygen atoms and a dicarboxylic acid selected from the group consisting of the dicarboxylic acids in which the carboxy groups are joined by aliphatic hydrocarbon radicals and the aliphatic dicarboxylic acids containing ether oxygen atoms, the ratio of ether oxygen to hydroxyl groups in the polyamide being 1/3–3:1 and the ratio of their total to the carbon atoms therein being 1:7–16 which emulsion can be coated out in the form of a thin layer onto a support to thereby form a coating which gels upon cooling.

2. A photographic emulsion comprising silver halide grains dispersed in an aqueous solution of a linear polyamide formed by the condensation of the hexamethylene diamine salt of $\alpha,\alpha'$-dihydroxy adipic acid and the hexamethylene diamine salt of ethylene bis glycolic acid in proportions such that the ratio of ether oxygen to hydroxyl in the polyamide is within the range of 1/3–3:1 and the ratio of their total to the carbon atoms therein is within the range of 1:7–16 which emulsion can be coated out in the form of a thin layer upon a support forming a coating which gels upon cooling.

References Cited in the file of this patent

UNITED STATES PATENTS

| | | |
|---|---|---|
| 2,191,556 | Carothers | Feb. 27, 1940 |
| 2,279,745 | Stevens | Apr. 14, 1942 |
| 2,299,839 | McQueen | Oct. 27, 1942 |
| 2,361,936 | Gaspar | Nov. 7, 1944 |
| 2,384,072 | Brubaker | Sept. 4, 1945 |
| 2,465,109 | McQueen et al. | Mar. 22, 1949 |

FOREIGN PATENTS

| | | |
|---|---|---|
| 590,820 | Great Britain | July 29, 1947 |
| 595,375 | Great Britain | Dec. 3, 1947 |
| 291,208 | Switzerland | Sept. 1, 1953 |